Patented Sept. 19, 1922.

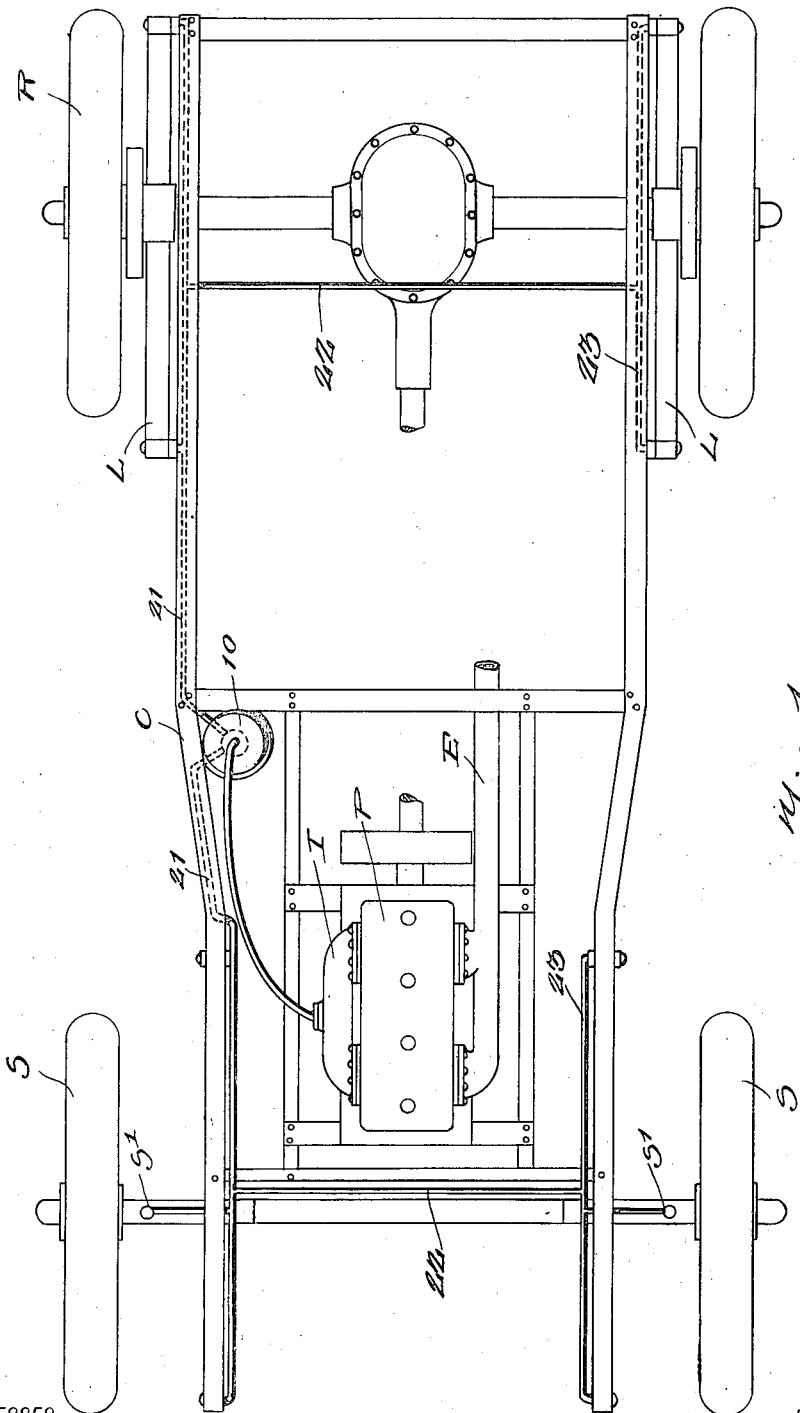

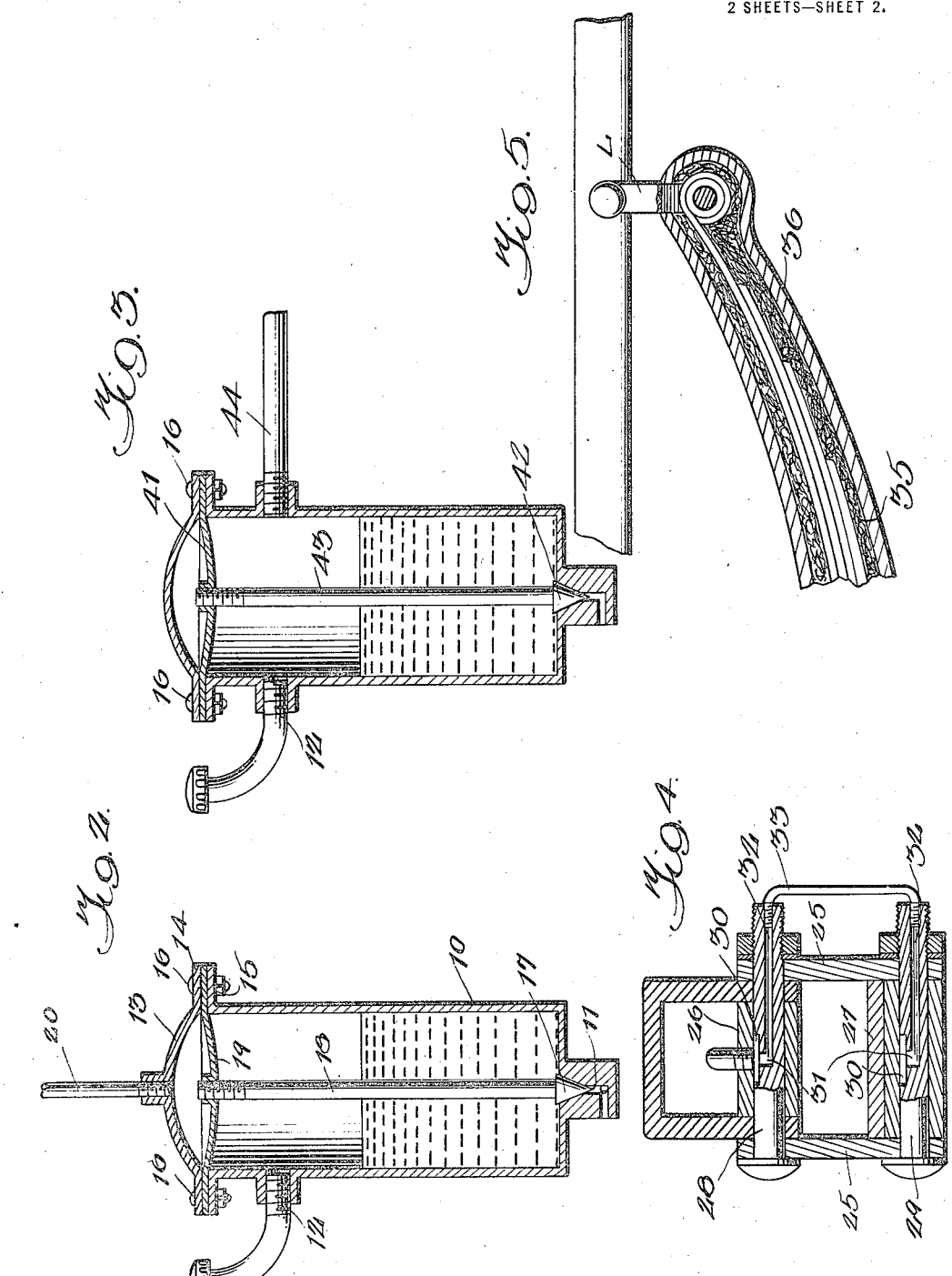

1,429,233

UNITED STATES PATENT OFFICE.

PALEMON H. GASKINS, OF JACKSONVILLE, FLORIDA.

LUBRICATING SYSTEM.

Application filed January 10, 1921. Serial No. 436,207.

*To all whom it may concern:*

Be it known that I, PALEMON H. GASKINS, a citizen of the United States, and a resident of Jacksonville, in the county of Duval and State of Florida, have invented certain new and useful Improvements in Lubricating Systems, of which the following is a specification.

The present invention relates in general to lubricating systems, and more particularly to lubricating systems especially adapted for motor vehicles.

The object of the invention is to provide a lubricating system of this character which insures a proper distribution and application of lubricant to the various elements of the vehicle, such as the chassis, spring suspension, steering mechanism, and the other mechanism and elements of the motor vehicle, which utilizes force and instrumentalities readily available and adapted for the purpose in all standard motor vehicles, and which is of simple and durable construction, reliable in operation, and easy and inexpensive to manufacture and apply.

Other objects and advantages reside in the certain novel features of the construction, combination and arrangement of parts which will be hereinafter more fully described and particularly pointed out in the appended claims, reference being had to the accompanying drawings forming a part of this specification, and in which:

Figure 1 is a plan view showing the assembly, parts being shown diagrammatically for the sake of illustration, Figure 2 is a view in transverse vertical section of the reservoir and controlling means, parts being shown in elevation for the sake of illustration, Figure 3 is a similar view of a modified form, Figure 4 is a detail view in transverse vertical section of the lubricating means of the spring suspension, Figure 5 is a similar view of the lubricating means for the spring proper.

Referring to the drawings wherein for the sake of illustration is shown the preferred embodiments of the invention, the motor vehicle which may be of any standard or conventional type includes a chassis C, running gear including rear drive wheels R, and front steering wheels S, the steering wheels being controlled by the conventional steering mechanism S', an engine or power plant P having an intake manifold I and an exhaust manifold E, and a suitable spring suspension embodying leaf springs L having shackle connections L' to the side members of the chassis.

In the form of the invention shown in Figures 1, 2, 4 and 5, there is included a reservoir 10 preferably of cylindrical construction and secured to the cowl dash of the vehicle beneath the hood thereof. The reservoir 10 is provided with a discharge outlet 11, and with an inlet 12 for the lubricant. The upper end of the reservoir is closed by a head 13 having a flange 14 which abuts a similar flange 15 formed on the reservoir and is secured thereto by means of nuts and bolts 16.

Pressure controlled means is provided for governing the flow of the lubricant through the discharge outlet of the reservoir, and comprises a needle valve 17 which cooperates with the discharge outlet and which has a stem 18 adjustably connected at its upper end to a diaphragm 19 or similar pressure responsive means. The diaphragm 19 has its annular marginal edge confined between the flanges 14 and 15 of the head and reservoir respectively, and the bolts and nuts 16 serve also to secure the diaphragm in position. If desired suitable packing means may be interposed between the diaphragm and the flanges. The diaphragm is exposed to the action of the suction or negative pressure of the intake manifold by means of a pipe or similar tubular connection 20, which is threaded into the head 13 at one end and into an opening tapped in the wall of the manifold.

Conveying devices are provided for carrying the fluid from the discharge outlet of the reservoir to the elements of the vehicle to be lubricated, such as the chassis, running gear, spring suspension, transmission, steering mechanism, etc. These conveying devices preferably comprise pipes 21 leading from the discharge outlet 11 to these various elements. The pipes 21 as clearly shown in Figure 1, are extended along the side member of the chassis to the front and rear of the vehicle, and then lead to the spring suspension and the other instrumentalities at the front and rear thereof, as will be hereinafter more fully described. Adjacent the front and rear, cross pipes 22 are provided and lead to other longitudinal pipes 23 which lead to the spring suspension and other instrumentalities on the other side of the vehicle.

The conveying devices for the spring suspension lead to the shackle connections thereof. These shackle connections as most clearly shown in Figure 4, include links 25, bushings 26 and 27, and upper and lower shackle bolts 28 and 29, respectively. Each of the shackle bolts have a longitudinal groove 30 in its periphery which communicates with a radial bore 31 which in turn communicates at its inner end with an axial bore 32 extending through the bolt to the outer end of the shackle thereof. The conveying devices or pipes leading from the reservoir to the spring suspension extend through the upper bushing 26 and discharge into the longitudinal groove 30 of the upper shackle bolt 28. The lubricant entering this longitudinal groove flows also through the radial bore 31 and then through the axial bore 32. The outer end of the axial bore is connected with the outer end of the axial bore of the lower shackle bolt by means of a pipe connection 33, so that the lubricant enters the lower shackle bolt 29 axially and leaves it radially.

The excess or discharge of oil from the shackle connection of the spring suspension is utilized to lubricate the leaves of the spring and for this purpose, the spring is surrounded by absorbent material 35 encased within a boot 36 split to permit assembly on the spring and suitably secured at its meeting ends adjacent said split. The boot 36 is of suitable flexible material and is impervious to the passage of the oil, or of water, or the like.

In operation with this form of the invention, when the engine is not running there is no distribution of the lubricant for the needle valve is normally closed. The tendency of the needle valve and the diaphragm to remain in closed position is not disturbed when the engine is idle, but when the engine is running the suction or negative pressure of the intake manifold is transmitted through the pipe 20 to the diaphragm and lifts the diaphragm together with the needle valve, thus opening the discharge outlet and permitting distribution of the oil or lubricant throughout the system. The oil which flows through the discharge outlet is uniformly distributed through the conveying devices and from the conveying devices is delivered to the elements of the motor vehicle to be lubricated.

In the embodiment of the invention shown in Figure 3, the reservoir is designated at 40, and is incorporated in the same organization as is the reservoir 10, with the single exception of the pressure controlling means for the discharge outlet. The pressure controlled means for regulating or governing the flow through the discharge outlet in this embodiment includes also a diaphragm designated at 41 associated with the reservoir 40 in the same manner as the diaphragm 19 is associated with the reservoir 10. A needle valve 42 cooperates with the discharge outlet and is provided with a stem 43 adjustably connected to the diaphragm 41. The diaphragm however, in this instance is not exposed to the negative pressure or suction of the intake manifold but is exposed to the positive pressure of the exhaust manifold E. This is accomplished by means of a pipe 44 which is threaded into the side wall of the reservoir and which communicates at its other end with the interior of the exhaust manifold. The pressure which this pipe 44 delivers to the reservoir operates not only on the diaphragm 41 but operates also on the lubricant itself, and thus effects not only the opening of the discharge valve or needle valve 42, but also a positive feed of the lubricant through the discharge outlet and through the conveying devices to the elements of the vehicle to be lubricated.

In practice with this embodiment of the invention the operation, with the exception of the action of the pressure controlled means, is the same as that of the hereinabove described embodiment, as in this latter embodiment the general form and features of the reservoir 40 are the same as that of the reservoir 10 and as, when this reservoir 40 is substituted for the reservoir 10, the organization and the relation of the elements thereof to each other, outside of the pressure controlled means, is identical with that of the first named embodiment.

I claim:—

1. In a lubricating system, in combination, a motor vehicle including an engine having a manifold, a chassis, a running gear, and a spring suspension having a cover enclosed leaf spring and a shackle connection, consisting of an upper and a lower shackle bolt, each of said shackle bolts having an axial and a radial bore, a reservoir for the lubricant having a discharge outlet, conveying devices from the discharge outlet to the chassis, running gear, and spring suspension, the conveying devices to the spring suspension leading to the radial bore of the upper shackle bolt, a pipe connection between the axial bores of the shackle bolt, means for utilizing the excess of lubricant from the shackle connection to lubricate the cover enclosed leaves of the spring, and pressure controlled means operated by the pressure in the manifold of the engine for governing the flow of the lubricant through the discharge outlet.

2. In a lubricating system for motor vehicles having an engine including an exhaust manifold, a reservoir having a discharge outlet, conveying devices from said discharge outlet to the elements of the vehicle to be lubricated, pressure controlled means governing the flow of the lubricant through said discharge outlet, including a needle valve cooperable with the discharge outlet and having a stem, a diaphragm having connection with the stem of the needle valve, and means for transmitting the pressure of the exhaust manifold to the space within the reservoir between the diaphragm and the discharge outlet whereby it is effective to lift the diaphragm and to positively feed the lubricant to the discharge outlet.

PALEMON H. GASKINS.